3,782,897
DYEING POLYAMIDE FIBERS WITH CHROMIUM-DONATING MONOAZO DYESTUFFS
Jacky Dore, Basel, Switzerland, assignor to Sandoz Ltd., Basel, Switzerland
No Drawing. Filed May 18, 1971, Ser. No. 144,620
Claims priority, application Switzerland, June 2, 1970, 8,228/70; Jan. 22, 1971, 985/71
Int. Cl. D06p 3/14
U.S. Cl. 8—43                                    9 Claims

ABSTRACT OF THE DISCLOSURE

Process for the dyeing of natural and synthetic polyamide fibres with a complex (obtained or the fibre) of 2 moles of a monoazo compound of formula

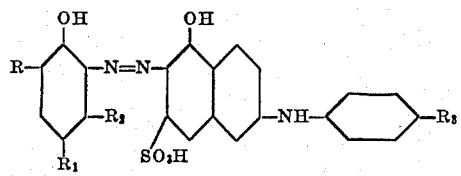

where

R and $R_1$ each stands for halogen,
$R_2$ is hydrogen or halogen,
$R_3$ is halogen or —$OR_4$, and
$R_4$ is an alkyl radical which may be substituted, and treated with 1 and 2 moles of a compound donating chromium.

---

This invention relates to a process for the dyeing of natural and synthetic polyamide fibres with monoazo compounds, which is characterized by the application tot he fibre of a complex of 2 moles of a monoazo compound of the formula

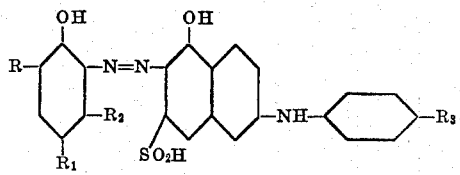

where

R and $R_1$ each stands for halogen,
$R_2$ for hydrogen or halogen,
$R_3$ for halogen or —$OR_4$, and
$R_4$ for an alkyl radical which may be substituted, obtained by treatment on the fiber with 1 to 2 moles of a compound donating chromium.

Good dyeings are obtained using a monazo compound of the formula

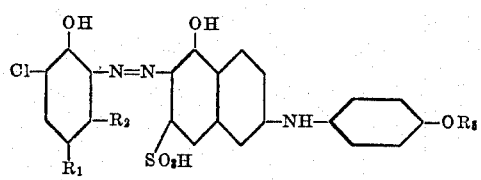

where $R_5$ represents a lower alkyl radical.

Compounds of Formula I can be obtained by coupling a diazotized aniline of the formula

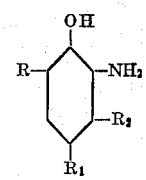

with a coupling component of the formula

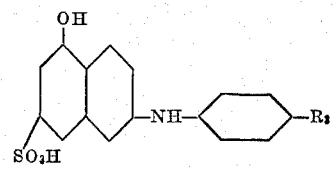

The coupling reaction can be carried out in an aqueous neutral to alkaline medium, preferably at pH 10.0 to 11.0, and at temperatures of —10° C. to 60° C., preferably 0–20° C., if necessary in the presence of coupling accelerants.

In each instance halogen represents a bromine, fluorine or iodine, or more especially a chlorine atom.

The alkyl radicals are generally lower alkyl radicals having 1 to 4 carbn atoms. If they are substituted they usually contain halogen atoms, cyano, hydroxyl or amino groups or an aryl radical, such as a phenyl radical. In such cases "alkyl" stands for an aralkyl, e.g. a benzyl, radical.

Chromic fluoride, chromic sulphate, chromic formate, chromic acetate, chromic potassium sulphate and chromic ammonium sulphate exemplify as suitable chromium donating compounds. The chromates, too, e.g. sodium and potassium chromate and bichromate, are highly suitable for the metallization of the said monoazo compounds.

The principal natural polyamides are wool and silk. The synthetic polyamides include types of different chemical constitution, as named in SVF-Fachorgan, 15, pp. 8–9 (1960); examples are the products produced by condensation of a dibasic acid, such as adipic acid and hexamethylene diamine (nylon 6,6), of caprolactam (nylon 6) and of aminoundecanoic acid (nylon 11).

Any of the known dyeing methods can be employed. Thus the polyamide fiber can be dyed with a compound of Formula I and simultaneously treated with a chromium donating agent in the same bath, or the compound of Formula I can be applied first and metallized on the fiber with the chromium donor, either in the dyebath or in a fresh bath.

It is best to carry out the process in an aqueous acid medium at temperatures up to 100° C. with the addition of an organic acid, such as acetic acid, or formic acid, and in the presence of sodium sulphate or ammonium sulphate.

The navy blue dyeings obtained have good fastness to light and wet treatments, such as washing, sea water, water, perspiration, milling and potting, along with good carbonizing and rubbing fastness.

In relation to polyamide dyeings produced with the nearest comparable known dyes in German Pat. 220,392, Example 3, dyeings on polyamide fibers produced by the present process have better fastness to wet treatments, notably alkaline perspiration fastness.

Further, it is surprising that polyamide fibers dyed by the process of this invention have better fastness properties, such as fastness to potting, than the dyeings prepared by monoazo compounds of Formula I which have been metallized with a chromium donor in substance. The dyeings are also of more brilliant shade.

In the following examples the parts and percentages are by weight and the temperatures in degrees centigrade.

EXAMPLE 1

0.7 part of dye of the formula

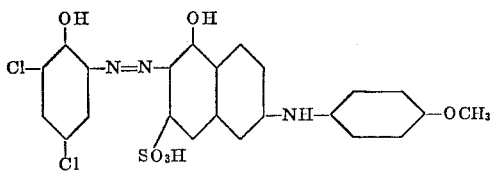

is dissolved in 6000 parts of water at 40–50°. To this solution are added 5 parts of sodium sulphate, 2 parts of glacial acetic acid and 2 parts of 85% formic acid. 100 parts of wool gabardine are entered into this dyebath and the temperature is then increased to the boil in 45 minutes, dyeing being continued at this temperature for 30 minutes. After this time a further 2 parts of 55% formic acid are added and dyeing is continued for 30 minutes at the boil. The bath is then cooled to 70°, set with 0.75 part of potassium bichromate and raised to the boil again. The fabric is treated for 30 minutes and on removal is treated further under normal conditions. A navy blue dyeing, which has good light and wet fastness properties, is obtained on the wool gabardine.

EXAMPLE 2

A dyebath is prepared by dissolving 1.5 parts of the dye of Example 1, 10 parts of sodium sulphate, 5 parts of ammonium sulphate and 1.5 parts of potassium bichromate in 6000 parts of water. 100 parts of wool gabardine are entered into the bath at 40°, the bath is brought to the boil in 60 minutes and the fabric dyed for 1 hour 30 minutes at this temperature. It is then further treated in normal manner. A navy blue dyeing of the same quality as that of Example 1 is obtained.

The dye specified in Example 1 can be produced as described in French Pat. 1,486,227 by coupling the diazo compound of 1-hydroxy-2-amino-4,6-dichlorobenzene with 2-(4'-methoxyphenylamino) - 5 - hydroxynaphthalene-7-sulphonic acid.

Comparably good dyeings on natural and synthetic polyamide fibers are obtained when the navy blue dye of the formula

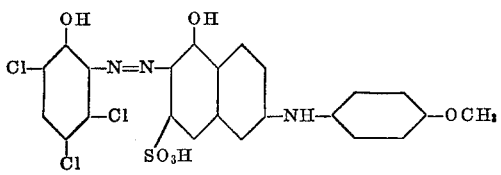

is applied by the procedures of Examples 1 or 2.

The dyes of the following formulae, which also give dyeings of navy blue shade, can be produced in the same manner:

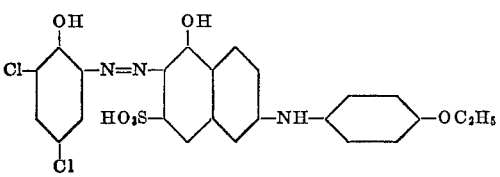

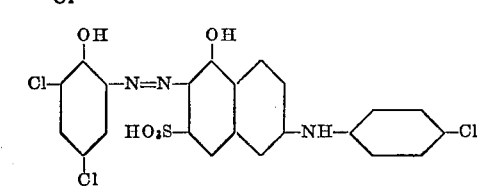

Having thus disclosed the invention what I claim is:

1. In a process for the dyeing of polyamide fiber which comprises applying a monoazo compound to the fiber and treating the fiber with a chromium-donating compound, the improvement wherein (a) said monoazo compound is a compound of the formula

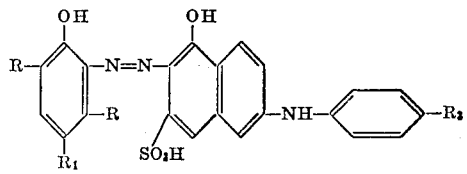

wherein
R is halo,
$R_1$ is halo,
$R_2$ is hydrogen or halo,
$R_3$ is halo or —$OR_4$, and
$R_4$ is alkyl or substituted alkyl, and
(b) said treatment is effected with from 0.5 to 1 mole of said chromium-donating compound per mole of said monoazo compound.

2. A process according to claim 1 wherein alkyl is lower alkyl, substituted alkyl is substituted lower alkyl, each substituent of substituted alkyl is independently halo, cyano, hydroxy, amino or phenyl, and each halo is independently fluoro, chloro, bromo or iodo.

3. A process according to claim 2 wherein the monoazo compound is applied to the fiber and the fiber is simultaneously treated with a chromium-donating compound.

4. A process according to claim 2 wherein the monoazo compound is applied to the fiber and the fiber is subsequently treated with a chromium-donating compound.

5. A process according to claim 2 wherein the polyamide fiber is a sythetic polyamide fiber.

6. A process according to claim 2 wherein the monoazo compound is a compound of the formula

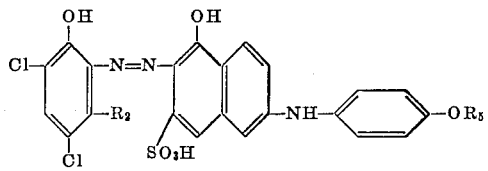

wherein
$R_2$ is hydrogen or halo, and
$R_5$ is lower alkyl.

7. A process according to claim 6 wherein the monoazo compound is the compound of the formula

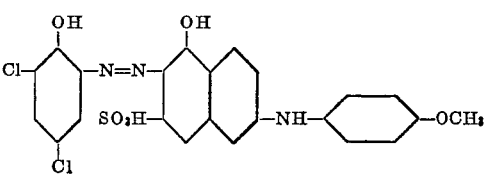

8. A process according to claim 2 wherein $R_3$ is halo.
9. Polyamide fiber dyed according to the process of claim 1.

References Cited
UNITED STATES PATENTS
1,417,869  5/1922  Toepfer _____ 8—43
3,516,979  6/1970  Dore et al. _____ 8—43 X FOREIGN PATENTS
220,392  12/1905  Germany.

GEORGE F. LESMES, Primary Examiner
P. C. IVES, Assistant Examiner

U.S. Cl. X.R.
260—151, 198